United States Patent [19]

Dunand et al.

[11] Patent Number: 5,049,899

[45] Date of Patent: Sep. 17, 1991

[54] METHOD OF HIGH RESOLUTION PRINTING USING SATELLITE INK DROPS IN A CONTINUOUS INK JET PRINTER

[75] Inventors: Alain Dunand, Valence; Eric Margaillan, Bourg de Péage, all of France

[73] Assignee: Imaje (SA), Bourg-Ls-Valence, France

[21] Appl. No.: 460,338

[22] PCT Filed: Oct. 16, 1989

[86] PCT No.: PCT/FR89/00533

§ 371 Date: May 17, 1990

§ 102(e) Date: May 17, 1990

[87] PCT Pub. No.: WO90/04518

PCT Pub. Date: May 3, 1990

[30] Foreign Application Priority Data

Oct. 18, 1989 [FR] France ................................ 88 14073

[51] Int. Cl.$^5$ ................................ G01D 15/18

[52] U.S. Cl. ................................ 346/1.1; 346/75

[58] Field of Search ................................ 346/1.1, 75

[56] References Cited

U.S. PATENT DOCUMENTS

| | | | |
|---|---|---|---|
| 4,150,384 | 4/1979 | Meece | 346/75 |
| 4,367,476 | 1/1983 | Sagae | 346/1.1 |
| 4,408,211 | 10/1983 | Yamada | 346/75 |
| 4,638,326 | 1/1987 | Yamada et al. | 346/75 |

*Primary Examiner*—Benjamin R. Fuller
*Assistant Examiner*—Gerald E. Preston
*Attorney, Agent, or Firm*—Roland Plottel

[57] ABSTRACT

A high resolution printing method is disclosed, implemented in a printer in which a continuous ink jet is broken up into drops (G) in a charging electrode (6) where they are selectively charged electrostatically, said drops then pass between deflection electrodes (9), the appearance of a satellite drop (Sn) from a main drop is caused by application of an appropriate voltage in the charging electrode during formation of said main drop and the coalescence of a satellite drop thus formed intended for printing with the following main drop is prevented, also by application of a voltage to the charging electrode during the formation of said main drop.

9 Claims, 8 Drawing Sheets

Figure 3:
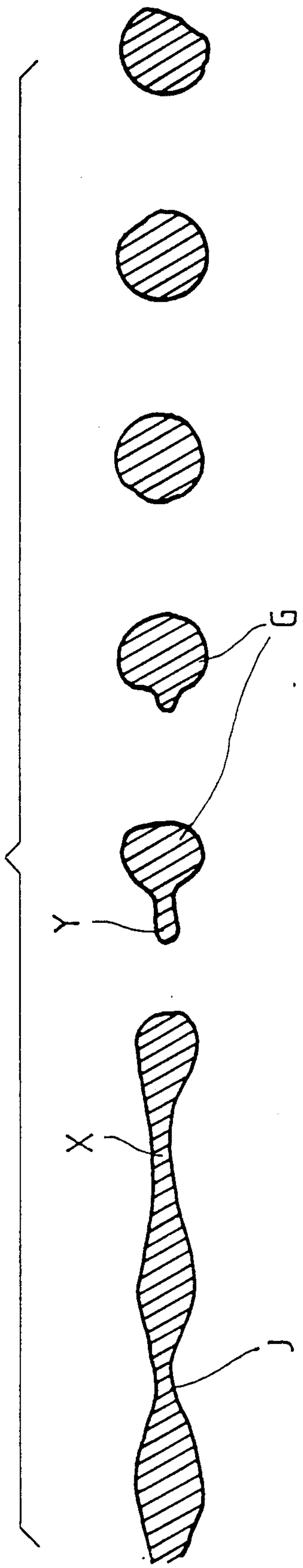

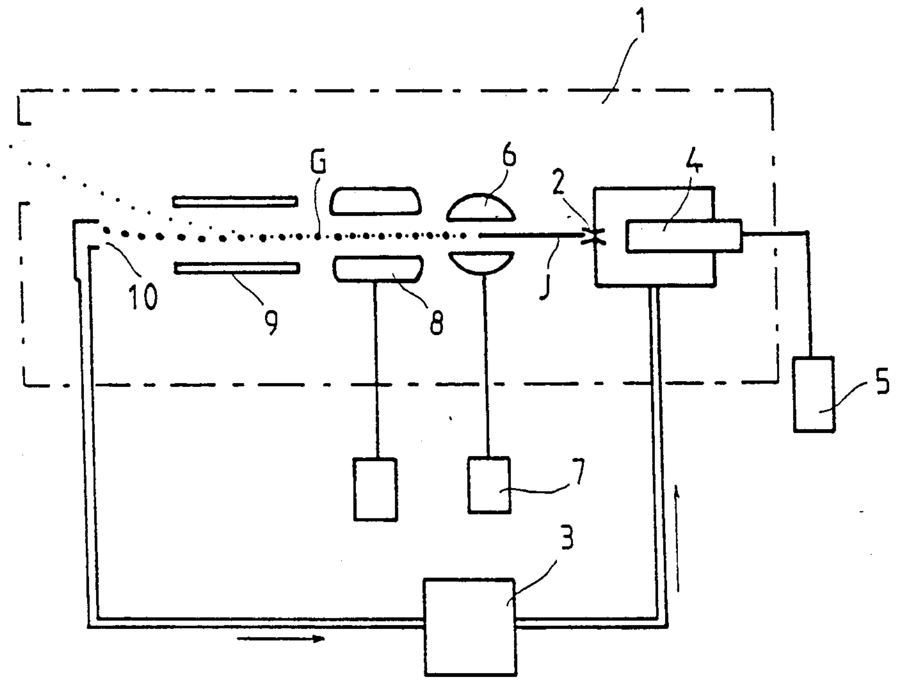
FIG. 1
FIG. 2a
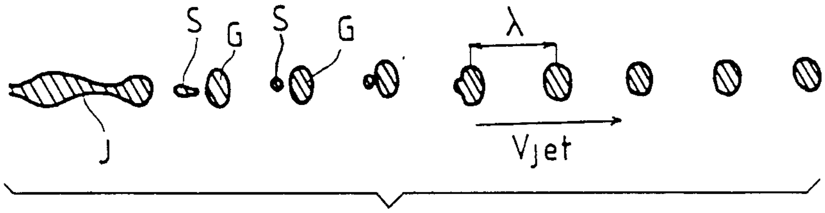
FIG. 2b
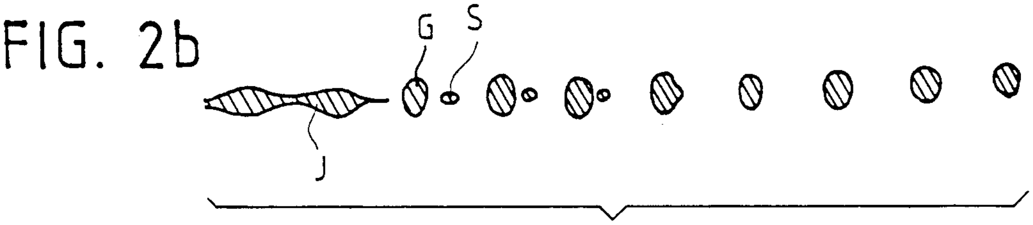
FIG. 2c
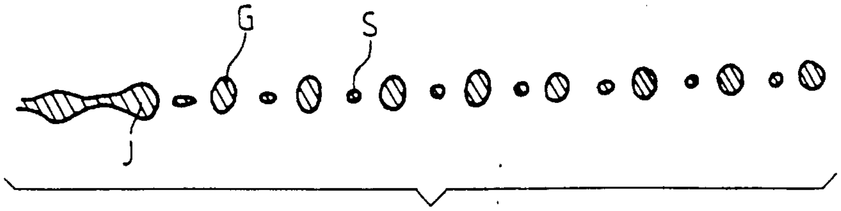

METHOD OF HIGH RESOLUTION PRINTING USING SATELLITE INK DROPS IN A CONTINUOUS INK JET PRINTER

The present invention relates to a method of high resolution printing in a continuous jet printer and, more particularly, a method of high resolution printing in which satellite drops are used controlled by the electric printing charge.

The conventional technique of writing by ink projection using a continuous jet of calibrated droplets, delivered by a modulation system, consists in charging these droplets electrostatically by means of an appropriate electrode. The passage of these variably charged droplets between electrodes brought to a high electric potential difference leads to deflection of the droplets proportional to their charge. Such deflection combined with the movement of the medium makes matrix printing of characters or graphisms possible.

In ink jet printers of the continuous jet type, the pressurized ink is ejected by the nozzle in the form of a jet which is caused to break up into a succession of droplets to which a charge is then selectively applied, and which are directed towards the printing medium or towards the gutter. Different methods may be used for controlling and synchronizing the formation of the droplets, consisting in causing the nozzle to vibrate or causing disturbances of the pressure of the ink at the level of the nozzle by using particularly a resonator energized by a piezoelectric ceramic upstream of the nozzle. Because of the disturbance, the jet breaks up at the disturbance frequency into uniform droplets, often accompanied by smaller droplets called satellite drops.

In conventional printers the main drops are used for printing and the presence of the satellite drops must be controlled. In fact, at the time of application of the charge of the droplets, the satellites have a higher charge per unit of mass than the main drops. If these satellites pass into the deflection field, they undergo considerable deflection and cause either soiling of the deflection electrodes leading to electric insulation defects, or parasite impacts on the printed medium.

The prior art—see the article by Bogy in the "Annual Review of Fluid Mechanics" 1979—shows that if the physical properties of the ink, the nozzle, the frequency of disturbance, the jet speed, the resonator device and the form of the energization signal applied to the resonator are fixed, it is possible to control the formation of the drops by the amplitude of the disturbance applied to the resonator. It is possible, in particular, to inhibit the formation of satellite droplets by choosing an amplitude adapted to the disturbance.

In the U.S. Pat. No. 4,068,241 to Hitachi, an invention is described which consists in using satellite drops for printing. Depending on whether it is desired to print a satellite droplet or not, the amplitude of the signal applied to the resonator is modulated at the drop formation frequency so as to form or inhibit the satellite drop. All the drops (main and satellite) are charged electrically at the time of their formation by electrostatic influence, through the application of a DC charging voltage to the charging electrode. They are then deflected in a fixed electric field. The main drops whose charge per unit of mass is low are little deflected and recovered in the gutter. The satellite drops whose charge per unit of mass is higher have a more deflected path and impact on the medium to be printed. This technology makes possible a high printing resolution—the size of the satellites and the resultant impacts being very small—while avoiding the use of a small diameter nozzle whose manufacture is always difficult. This also makes it possible to overcome the problems of clogging of the nozzle during its use.

In practice, this technology is difficult to implement. In fact, the method of controlling the formation of the satellites by the amplitude of the signal applied to the resonator is difficult, because it is difficult to correctly control reproducibility in the manufacture of the resonators. It is generally necessary to calibrate each resonator so as to know its electromechanical efficiency. In addition, the application of a DC charging voltage to the formation electrode may lead to electrolysis and corrosion phenomena in the cavity bathed by the ink upstream of the nozzle.

Furthermore, printing by this method is of the "binary" type, in that a satellite drop is either printed, or is inhibited and recycled to the gutter with the rest of the jet, thus permitting a single level of deflection. Printing on a large surface requires numerous relative movements between the printing head and the medium to be printed. Several nozzles may also be juxtaposed, with a spacing equal to the printing resolution, but this raises problems of miniaturization which are difficult to surmount. In particular, the acoustic coupling between the resonators of the different nozzles, very close to each other, generally disturbs the formation of the droplets and makes the control of the satellites very difficult.

The main object of the invention consists in using satellite drops for printing, while overcoming the above drawbacks.

Guided by an experimental approach, we have determined the conditions for creating satellite droplets through the application of appropriate charging voltages to the charging electrode.

According to the invention, it is also possible to control the path of the satellite drops from the position where they are formed as far as the printed medium by combining the application of appropriate charging voltage sequences to the charging electrode and the action of an electric deflection field. It is further possible to deflect a succession of satellite drops with different paths towards the medium. As in conventional printers using the main drops for printing, we obtain then the printing of dot patterns corresponding to different paths of droplets from the same nozzle, and the printing of characters and graphisms then only requires a simple relative movement between the printing head and said medium, combined with the printing of successive patterns.

Figure 4A:
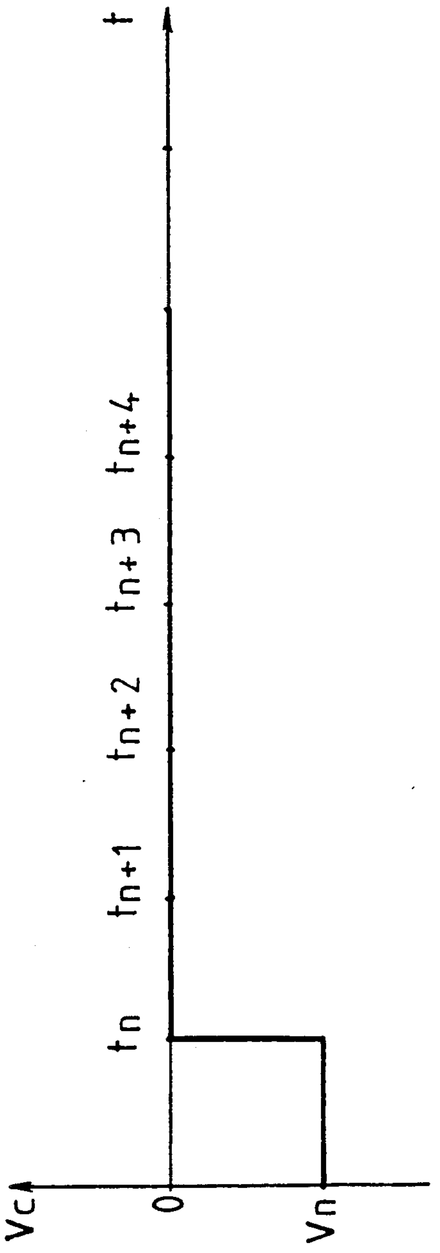
Figure 4B:
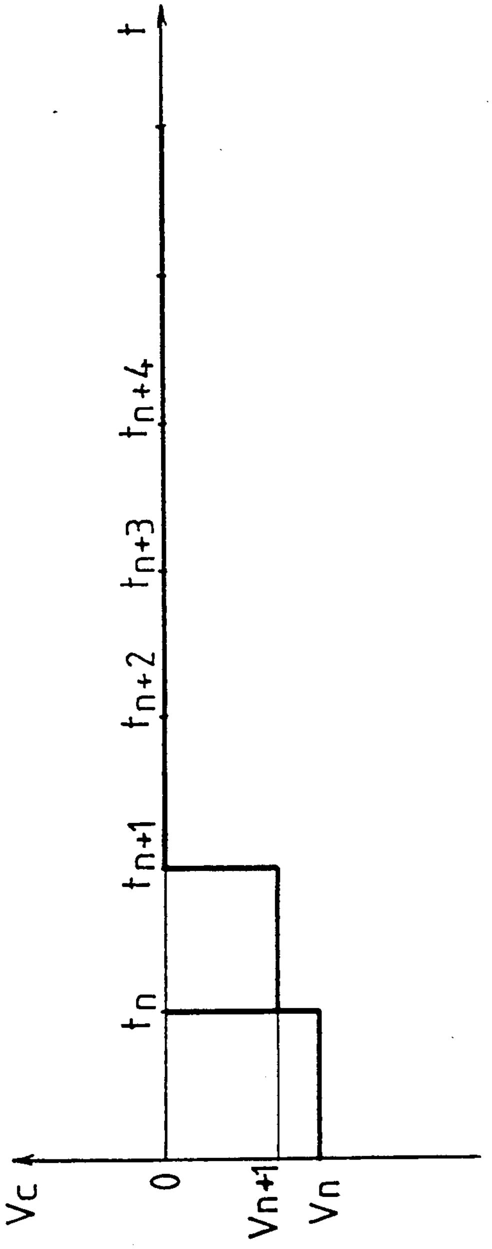

The above-mentioned characteristics of the invention as well as others will be clear from the following description of one embodiment, with reference to the accompanying drawings in which:

FIG. 1 is a schematic view showing the main electric and mechanical elements of a printing head in an ink jet printer in which the method of the invention is implemented;

FIGS. 2*a* to 2*c* show schematically the formation and behaviour of satellite drops obtained by a known means;

FIG. 3 shows schematically the form of drops obtained in the case where breaking up of the jet does not produce satellite drops;

FIG. 4*a* and 4*b* are diagrams illustrating charging voltages with respect to time serving, in the first case, for generating satellite drops and, in the second case, for generating and using satellite drops for printing;

FIGS. 5*a* to 5*e* illustrate schematically states of the jet, upstream and downstream of the breaking up position, corresponding to successive time intervals shown in FIG. 4*a;*

FIGS. 6*a* to 6*e* illustrate schematically states of the jet upstream and downstream of the breaking up position corresponding to the successive time intervals shown in FIG. 4*b;*

Figure 7:
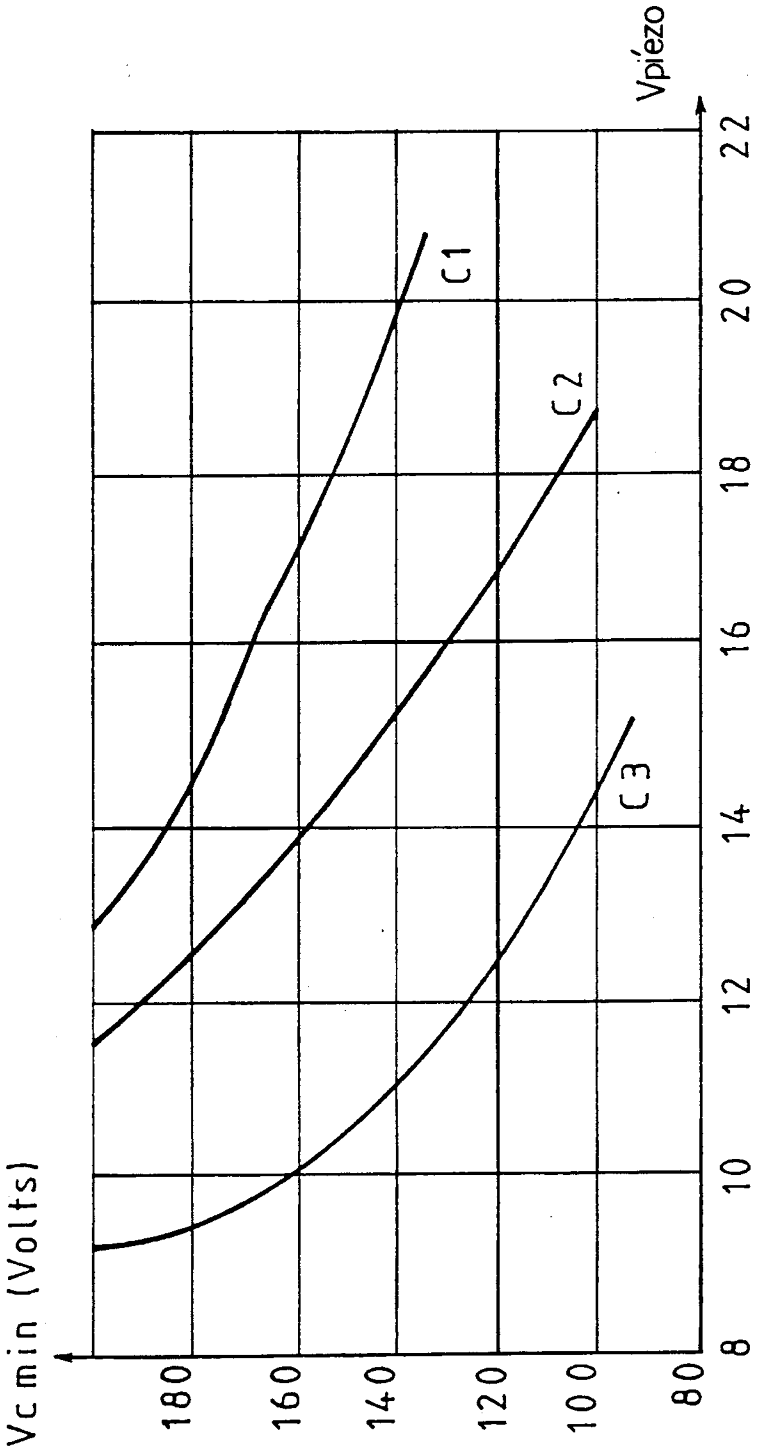
Figure 8:
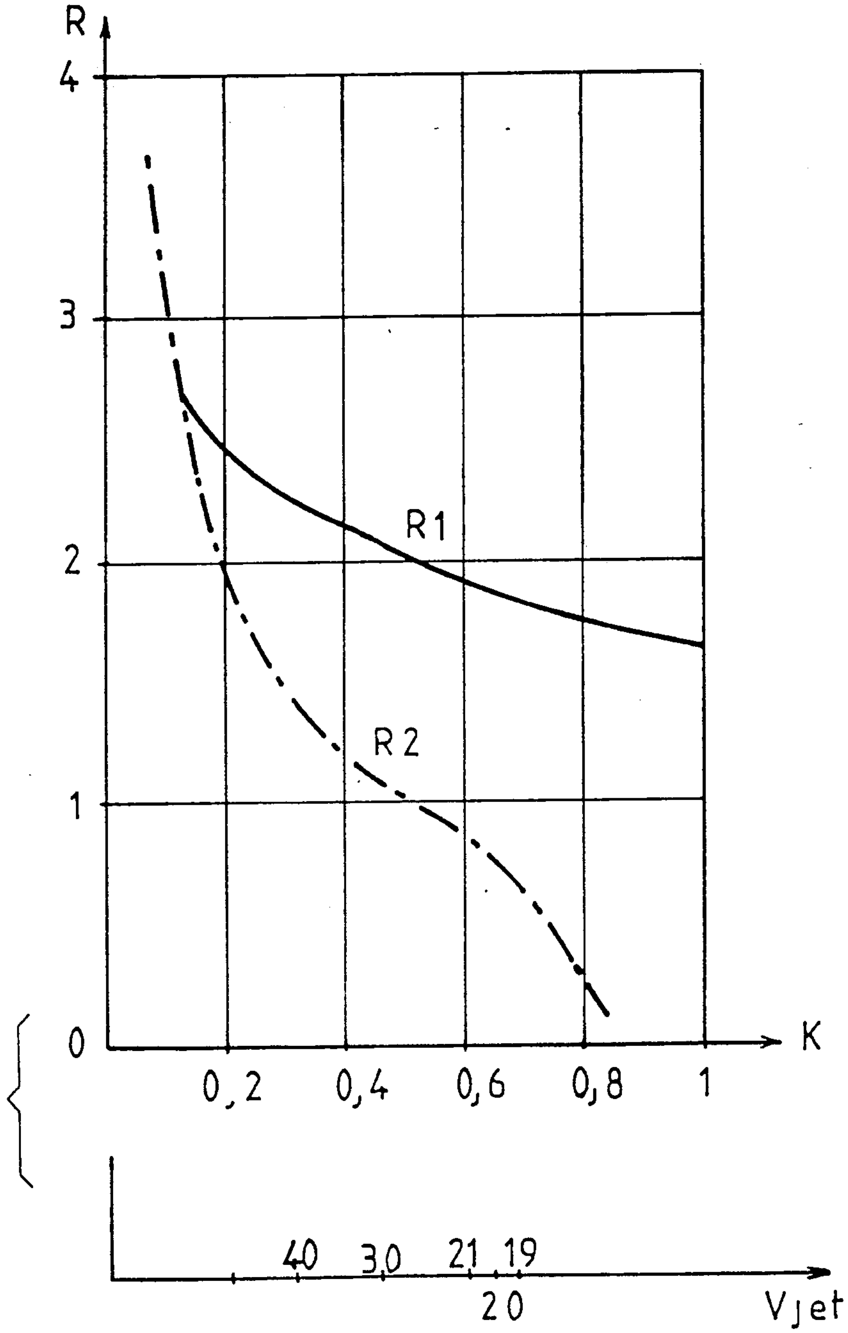
Figure 9:
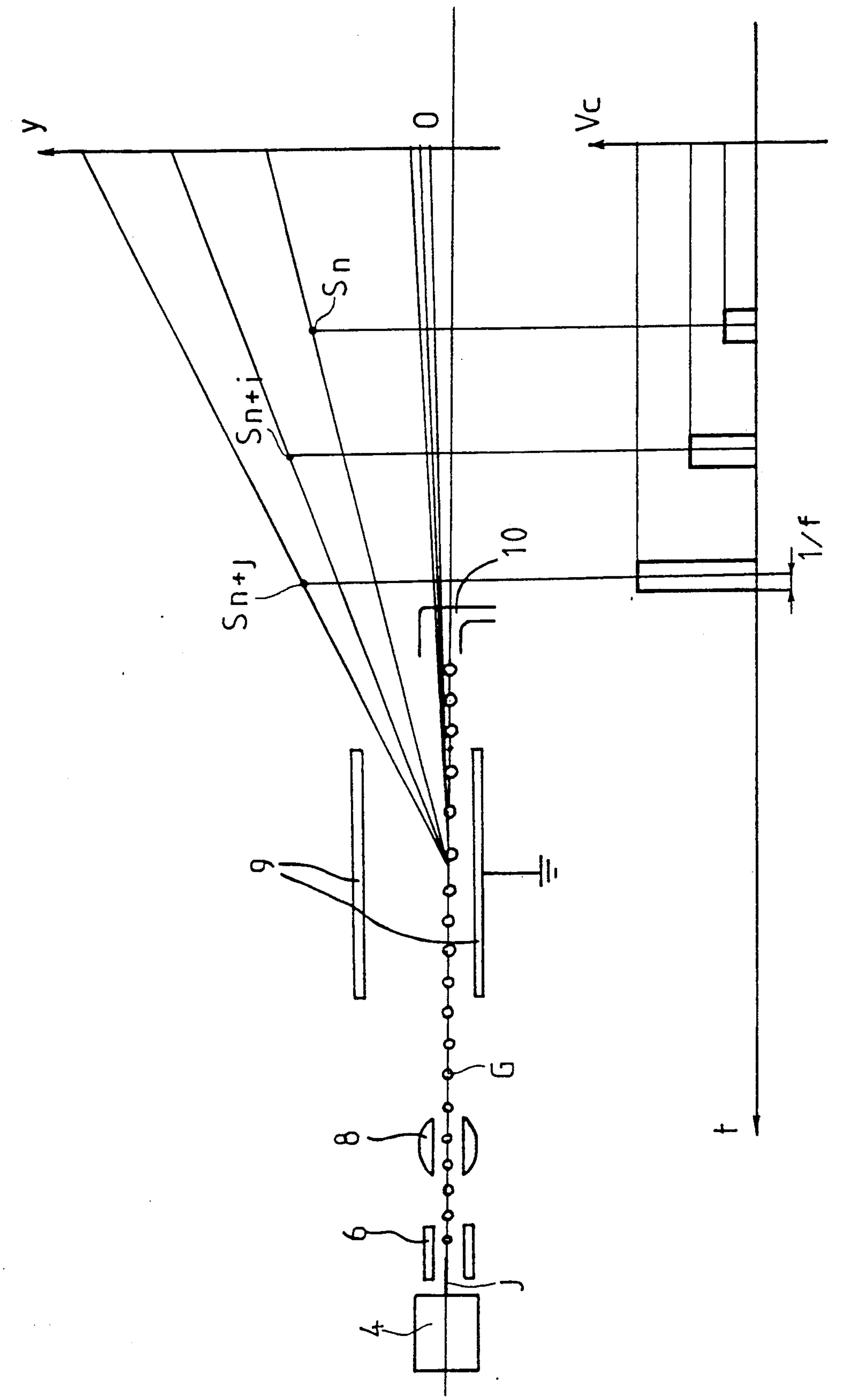

FIG. 7 shows three curves representative of the relation between the minimum charging voltage required for the formation of a satellite drop and the efficient voltage for energization of the resonator, for three different jet speeds;

FIG. 8 is a diagram illustrating the respective ratios between the diameters of a drop and a satellite drop and the diameter of the nozzle, as a function of a parameter which will be defined hereafter and, under particular conditions, as a function of the jet speed; and FIG. 9 is a schematic view illustrating the operation of a printer in which the method of the invention is implemented, and showing in particular the difference of amplitude of deflection of the satellite drops with respect to the main drops.

The printing head 1 shown in FIG. 1 is an ink jet printing head of continuous jet type. It comprises essentially a nozzle 2 fed with pressurized ink by an ink circuit 3 and creating a continuous jet J. Under the influence of the vibration of a resonator 4 fed by a modulation circuit 5, the continuous jet J is broken up at the centre of a charging electrode 6 into a continuous succession of droplets. The charging electrode is connected to a charging circuit 7. The drops then pass through a detector 8, used as phase and drop speed detector. The detector 8 may form part of a device for regulating the ink and its operation is of the type described in the patent application registered under the number 88 12935 and filed in the name of the present Applicant. The charged drops are then deflected by a DC electric field maintained between deflection electrodes 9. The drops which are not charged or little charged are recovered in a gutter 10, whereas the others continue their flight towards a recording medium, not shown. The drops recovered by gutter 10 are recycled to the ink circuit 3.

In the absence of electric effects, the phenomenon of breaking up of the jet into droplets G is at the present time well characterized experimentally, even though the theory for completely describing such behaviour remains very difficult to perfect. The above mentioned prior art shows in particular that the parameters such as the amplitude of the resonator energization signal, the wavelength of the disturbance defined by $\lambda = Vjet/f$ (where Vjet represents the jet speed and f the energization frequency of the resonator) or the presence of different harmonics in the energization signal may lead to the formation of satellite drops S such as shown in FIG. 2. Depending on the combinations of these parameters, the satellite drops situated between the main drops may be "rapid", FIG. 2*a*, i.e. they have a higher speed than that of the main drops; "slow", FIG. 2*b*, when their speed is lower than that of the main drops, or "infinite", FIG. 2*c*, when their speed is equal to that of the main drops.

FIG. 3 illustrates schematically the form of the jet, at the breaking up position, obtained under optimum conditions of operation of a conventional printer, namely a printer in which the main drops G are used for printing. The fluid ligament X connecting the main drops together immediately upstream of the breaking up position do not give rise to the formation of a satellite drop but lead to the appearance of a small tail Y on the main drop which has just been formed. Such optimum conditions are obtained by adjusting one at least of the abovementioned parameters (amplitude of the energization signal, energization wavelength, harmonics in the energization signal).

According to the invention, at the time of application of an appropriate charging voltage Vn to a drop Gn being formed, and for the same values of the other parameters as for the case shown in FIG. 3, the formation of a satellite drop Sn is obtained. The voltage Vn applied to drop Gn being formed is shown in the diagram of FIG. 4*a* where the successive time intervals limited by times tn, tn+1, etc. correspond to the period of the energization signal, namely to the formation of the successive drops Gn, Gn+1, etc.

Figures 5A, 5B, 5C, 5D, 5E:
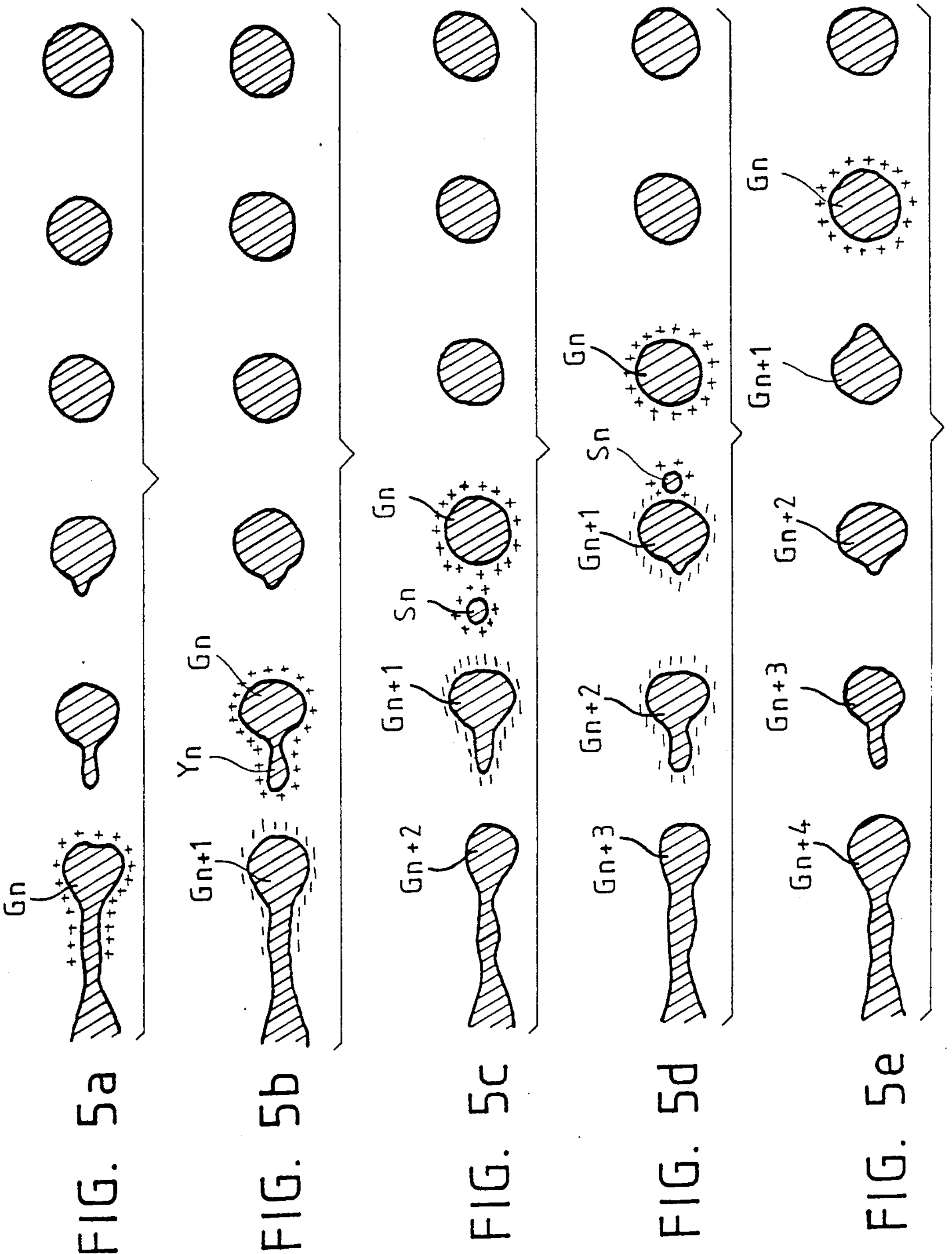

During the period up to time tn, which corresponds to the formation of drop Gn, namely the condition shown in FIG. 5*a*, at the time of application of the charging voltage Vn (the charging voltage being negative in the case chosen), electric charges of opposite sign, shown schematically by the signs + in FIG. 5*a*, appear at the end of the continuous jet J. At the time of breaking up of the jet, namely after time tn, drop Gn is separated and takes with it these electric charges, which it keeps along the path. This situation is shown in FIG. 5*b*. It will be noted then that in the absence of a charging voltage applied between times tn and tn+1, the positive charges carried by drop Gn induce charges of opposite sign on the drop being formed Gn+1. For given jet speed, energization signal amplitude and form and physical properties of the ink conditions, which are characteristic of the invention and described hereafter, the tail Yn of drop Gn formed has a sufficient size for the repulsion between the electric charges present at the surface of drop Gn to lead to rupture between tail Yn and the body of drop Gn, causing the creation of a satellite droplet Sn, FIG. 5*c*. This satellite droplet Sn, under the combined effect of the repulsion forces related to the positive charges remaining on the main drop Gn and the attraction forces resulting from the negative charges carried by drop Gn+1, draws rapidly closer to the latter, FIG. 5*d*, and coalesces therewith shortly after its creation, FIG. 5*e*. In this case, rapid coalescence of satellite Sn with drop Gn+1 does not allow the satellite to be used for printing.

Figure 6A:
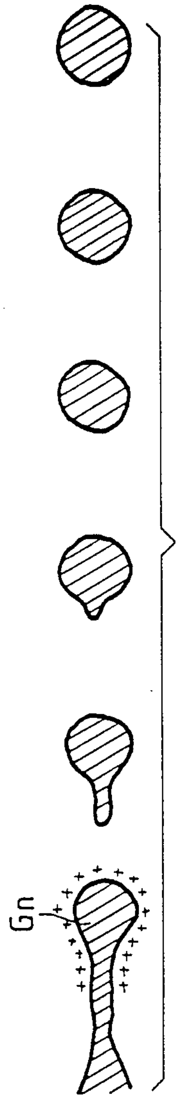
Figure 6B:
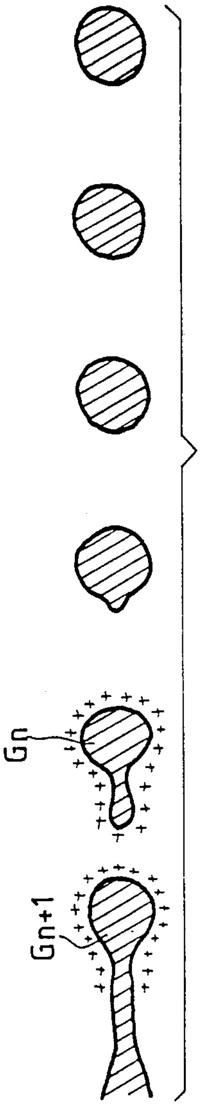
Figure 6C:
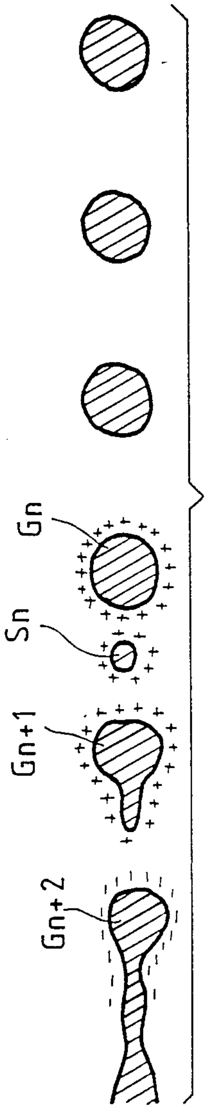
Figure 6D:
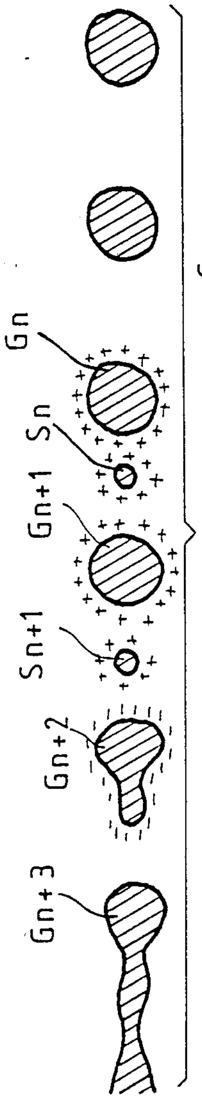
Figure 6E:
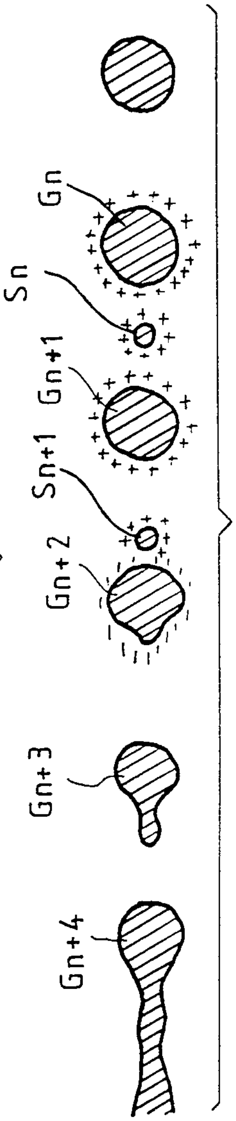

According to a characteristic of the invention, this coalescence phenomenon is inhibited by application, during the time of formation of the following drop Gn+1, namely between times tn and tn+1, of a voltage Vn+1 of an amplitude substantially equal to Vn, so as to charge drop Gn+1 electrically with charges of the same sign as those carried by satellite Sn. The voltage Vn+1 is shown in the diagram of FIG. 4*b*. Thus, as can be seen in FIGS. 6*c* to 6*e*, the droplet Sn remains for a sufficiently long time in the jet between the main drops Gn and Gn+1 to pass through the electric deflection field situated downstream and be deflected towards the printing medium. Printing of a satellite drop Sn is therefore characterized by a succession of two consecutive charging voltage square waves Vn and Vn+1 having substantially equal amplitudes. The voltage Vn+1 required for controlling the satellite Sn generally leads to the formation of a satellite Sn+1, shown in FIG. 6*d*, for the same reasons as those mentioned in the case of satellite Sn in FIG. 5. This satellite Sn+1 is however not printed in the absence of voltage Vn+2 during the formation of drop Gn+2 for it rapidly coalesces with the latter.

Even though the theoretical analysis of the process of formation and control of the droplets described above is limited, the experimental implementation of the process is very reproducible. It requires preferably a low viscosity of the ink, advantageously less than 3 centipoises, a high amplitude of energization of the resonator and a relatively high jet speed.

In a particular embodiment using a nozzle with a diameter of 50 microns, a drop frequency of 83.333 kHz, a triangular form for the energization signal and an ink whose viscosity is 3 centipoises, the relation between the minimum charging voltage Vcmin required for creating a satellite drop and the efficient energization voltage Vpiezo of the resonator is shown in FIG. 7. The curves C1, C2 and C3 appearing in FIG. 7 correspond respectively to three jet speeds: 19 milliseconds for curve C1, 20 milliseconds for curve C2 and 21 milliseconds for curve C3. For these different jet speeds, the relative sizes of the satellites with respect to the main drops are about $\frac{1}{3}$. These results are in agreement with the results published in technical literature up to date (see Lafrance P., "Physics of fluids", vol 18 (1975), page 28) and shown schematically in FIG. 8. The curves R1 and R2 are representative respectively of the ratios between the diameters of the main drops and of the satellite drops and the diameter of the nozzle, as a function of a parameter k defined as follows:

$$k = \frac{\pi OB}{\lambda}$$

where OB is the diameter of the nozzle and λ the wavelength of the disturbance (λ=Vjet/f where Vjet represents the jet speed and f the resonator energization frequency). For a nozzle diameter fixed at 50 microns and an energization frequency of the resonator of 83.333 kHz, there are also shown in the diagram of FIG. 8, on a secondary abscissa axis, jet speeds in milliseconds. Thus, it can be seen that the size of the satellite is much more sensitive to the jet speed than that of the main drops. This makes it possible to choose the adapted jet speed as a function of the impact diameter to be printed.

For a given charging voltage, the paths followed by the satellite drops are moreover very different from that of the main drops. The deflections of the drops are in fact proportional to the inverse of the square of their diameter, namely a ratio of about 1/9 between the amplitude of deflection of the main drops and that of the satellite drops. Thus, satellite droplets can be printed with several levels of deflection, using different charging voltages, while recovering the main drops in the gutter. This is illustrated in FIG. 9 which shows the essential elements of the printing head of FIG. 1 as well as the plan of the printing medium at Oy. In the lower part of FIG. 9, the diagram shows the charging voltage square waves which have been applied respectively by the charging electrode 6 for forming the droplets Sn, Sn+i and Sn+j. As was described above, said square waves correspond to the times of formation of two main drops between which the satellite drop is located, namely to a double period of the energization signal.

Implementation of the method of the invention is furthermore relatively simple, for it only requires a small number of modifications with respect to conventional printers using main drops for printing. Different methods for regulating and controlling the printer used in conventional printers (synchronization of the charge by phase detection, drop speed control, viscosity regulation, these latter two being described for example in the patent application 88 12935 already mentioned) may also be used. Only the charging voltages are modified, depending on whether it is desired to print main drops or satellite drops.

It will be noted that it is possible to provide a mixed printing method in which main drops or satellite drops would be printed selectively. In such a method, by varying the charging voltage appropriately, either the formation and charging of satellite drops could be caused or the charging of main drops without the appearance of satellite drops. In the case of printing main drops, the voltage between the deflection electrodes would then have to be substantially increased with respect to its value for satellite drops.

We claim:

1. Method of high resolution printing using satellite ink drops, used in a continuous ink jet printer in which a continuous ink jet (J) leaving a nozzle (2) is broken up by a breaking up means (4, 5) into substantially equidistant droplets of equal dimensions, in a charging electrode (6) where said droplets are selectively charged electrostatically, said droplets then passing between deflection electrodes (9) where they are deflected depending on their charge density, characterized in that it consists in causing the appearance of a satellite drop (Sn) from a drop (Gn) downstream of the position at which the jet (J) is broken up, by application of an appropriate charging voltage (Vn) in the charging electrode (6) during the formation of said drop (Gn) and in preventing the coalescence of a satellite drop thus formed intended for printing with the next drop (Gn+1), until said satellite drop intended for printing is deflected between the deflection electrodes (9), by application to the charging electrode during the formation of the drop (Gn+1) of a charging voltage (Vn+1) substantially equal to the charging voltage (Vn), the value given to the charging voltage (Vn) and consequently to the voltage (Vn+1) being chosen also as a function of the amplitude of deflection desired for the satellite drop intended for printing.

2. Method according to claim 1, characterized in that the ink used for its implementation has low viscosity.

3. Method according to claim 2, characterized in that the viscosity of the ink is about 3 centipoises.

4. Method according to any one of claims 1 to 3, characterized in that it is implemented with a high jet speed and a high amplitude of the energization signal.

5. Method according to any one of claims 1 to 3, characterized in that the size of the satellite drops is varied by modifying the jet speed (J).

6. Method according to any one of claims 1 to 3, characterized in that it is used in combination with a printing method consisting in printing main drops (Gn).

7. A method according to claim 4 characterized in that the size of the satellite drops is varied by modifying the jet speed (J).

8. A method according to claim 4 characterized in that it is used in combination with a printing method consisting in printing main drops (Gn).

9. A method according to claim 5 characterized in that it is used in combination with a printing method consisting in printing main drops (Gn).

* * * * *